INVENTOR:
FRANK T. COURT
HAROLD M. STUELAND

Oct. 6, 1942.  F. T. COURT ET AL  2,298,199
PORTABLE HOIST
Filed Sept. 12, 1940   5 Sheets-Sheet 3

INVENTOR:
FRANK T. COURT
HAROLD M. STUELAND
BY
ATTORNEYS.

Oct. 6, 1942.   F. T. COURT ET AL   2,298,199
PORTABLE HOIST
Filed Sept. 12, 1940   5 Sheets—Sheet 4

INVENTOR:
FRANK T. COURT
HAROLD M. STUELAND
BY
ATTORNEYS.

Oct. 6, 1942.  F. T. COURT ET AL  2,298,199
PORTABLE HOIST
Filed Sept. 12, 1940  5 Sheets-Sheet 5

INVENTOR:
FRANK T. COURT
HAROLD M. STUELAND
BY
ATTORNEYS.

Patented Oct. 6, 1942

2,298,199

UNITED STATES PATENT OFFICE 2,298,199

PORTABLE HOIST

Frank T. Court, Moline, and Harold M. Stueland, East Moline, Ill., assignors to Deere & Company, Moline, Ill., a corporation of Illinois Application September 12, 1940, Serial No. 356,410

29 Claims. (Cl. 212—38)

The present invention relates generally to portable hoists and has for its principal object the provision of a portable hoist that is compact, light in weight and simple in construction and operation, but is strong and durable and efficient. Another object of our invention relates to the provision of a detachable hoist which can be furnished as an attachment for a standard type of farm tractor and which is easily installed on a tractor and secured thereto by the usual mounting means provided on such tractors for supporting agricultural implements and other devices.

More specifically, it is another object of our invention to provide a portable detachable hoist which can be mounted on the rear axle housings of the tractor in such position that the hoist can be operated from the usual operator's seat on the tractor after the seat has been reversed on its supporting standard.

A further object relates to the provision of a detachable hoist for installation on the rear end of a tractor, but which is provided with its independent retractable ground support for relieving the weight of the load from the tractor frame during operation. A further related object has to do with the provision of a novel and efficient means for mounting and controlling the retractable ground support. A further specific object has to do with the provision of a detachable hoist in which rigidity, simplicity and lightness in weight are obtained by the provision of a rigid mast which is supported in fixed position on the tractor and which forms a support for the various other parts of the implement.

These and other objects and advantages of our invention will be made apparent by a consideration of the following description in which reference is had to the drawings appended hereto, in which Figure 1 is a plan view of a detachable hoist mounted on the rear end of a tractor and embodying the principles of the present invention;

Figure 1:
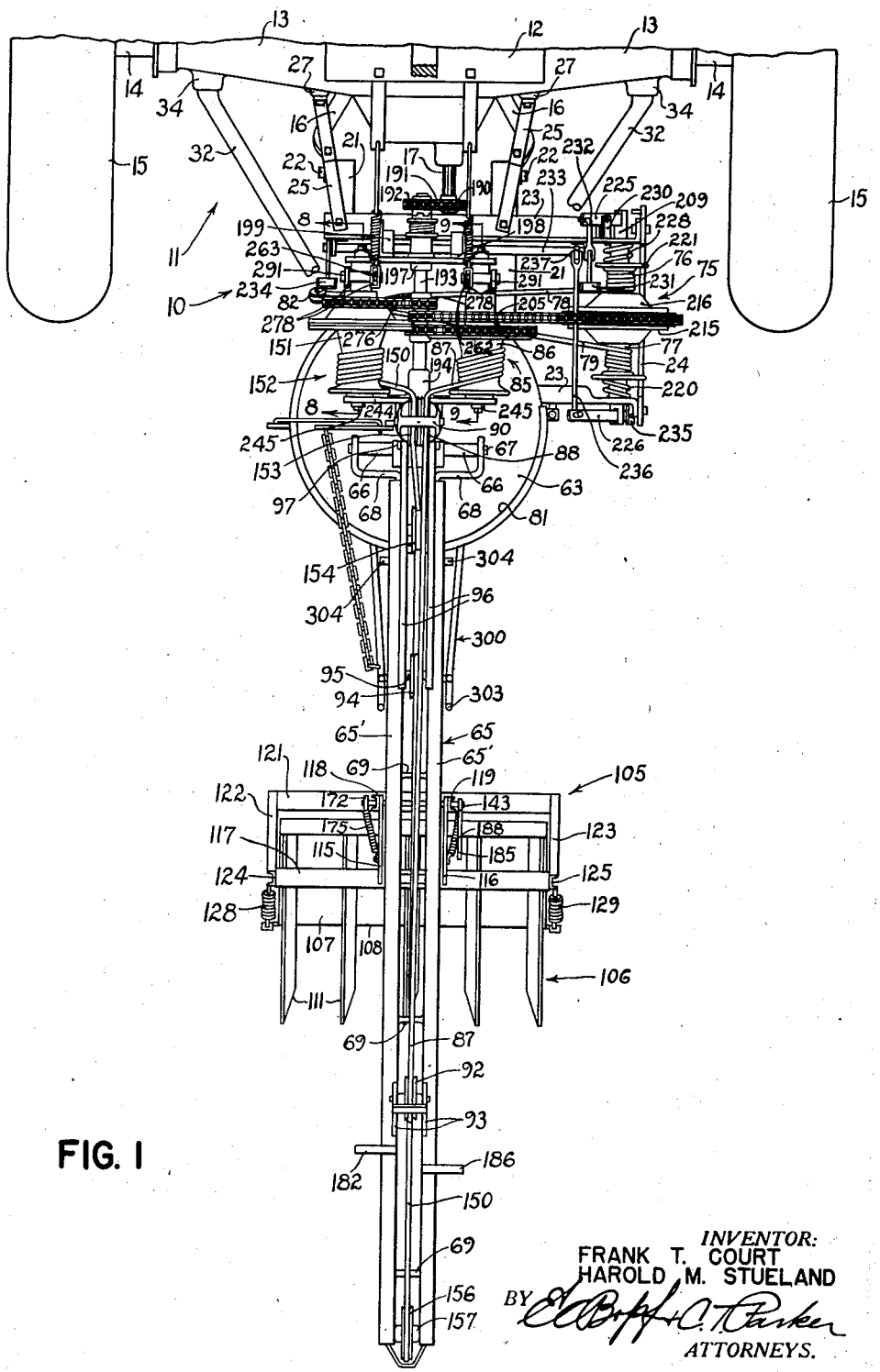
Figure 8:
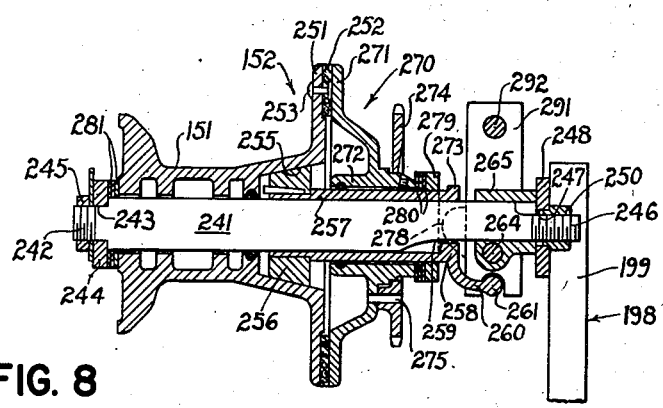
Figure 9:
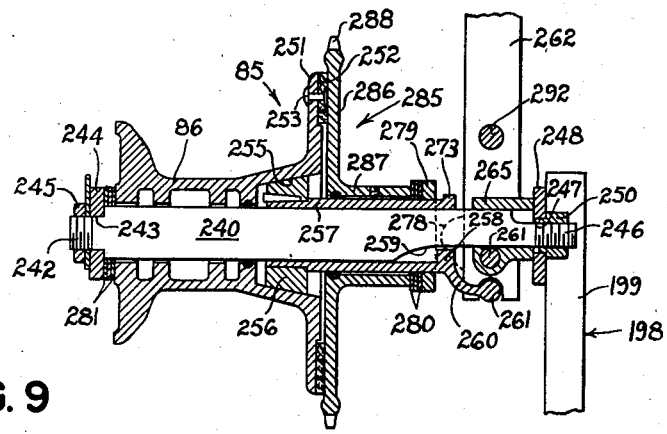

Figure 8 is a similar sectional view showing the details of construction of the clutch and winding drum assembly, which controls the travel of the carriage along the boom, as indicated by line 8—8 in Figure 1, and drawn to an enlarged scale; and Figure 9 is a similar sectional view as taken along a line 9—9 in Figure 1, and showing in an enlarged scale the details of construction of the cultch and winding drum assembly, which controls the raising and lowering of the boom.

Reference is hereby made to a companion application Serial No. 358,870, filed September 28, 1940, by Frank T. Court, which covers other features of this portable hoist which are not claimed herein.

Figure 2:
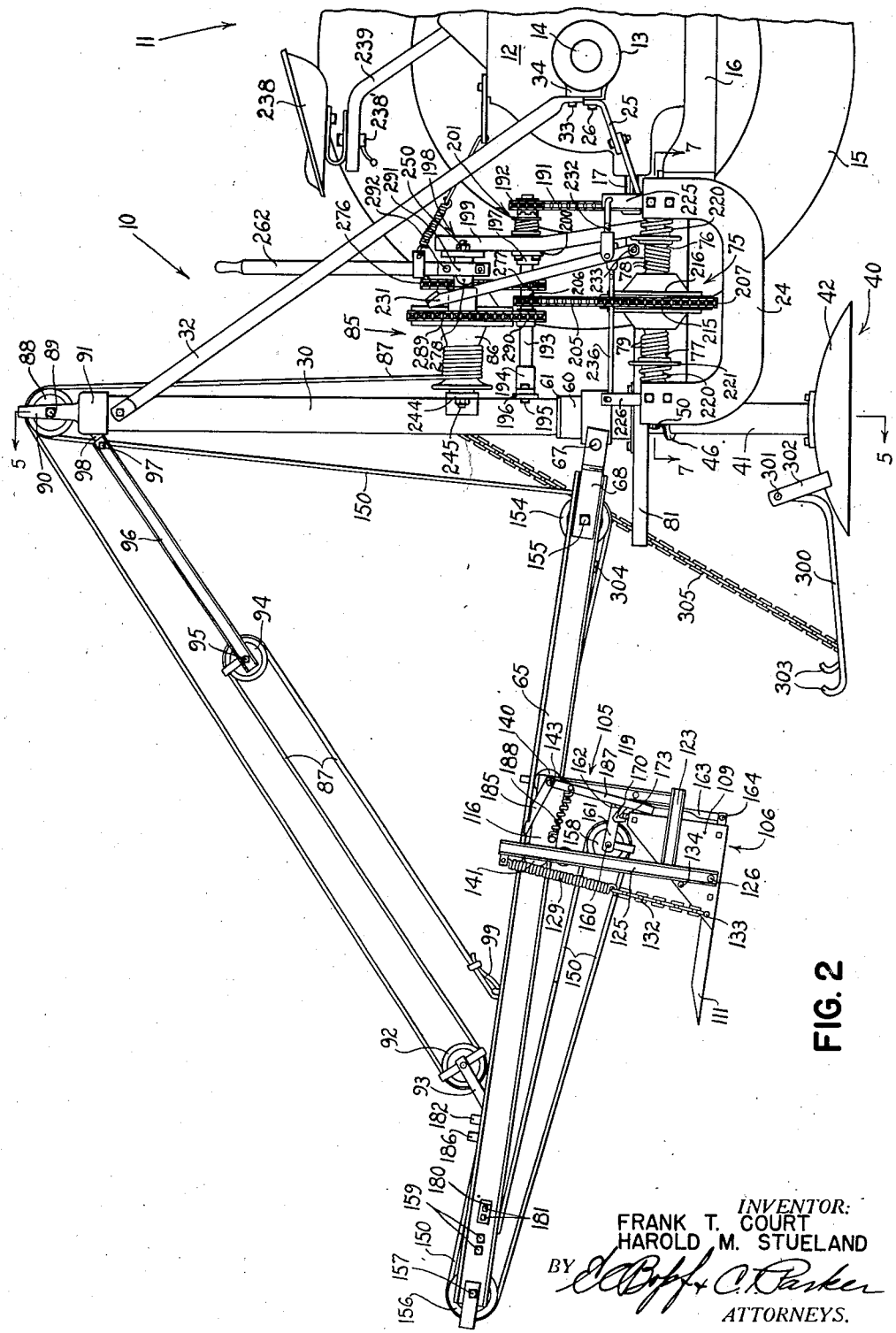
Figure 2 is a side elevation of the hoist shown in Figure 1.
Figures 4, 5:
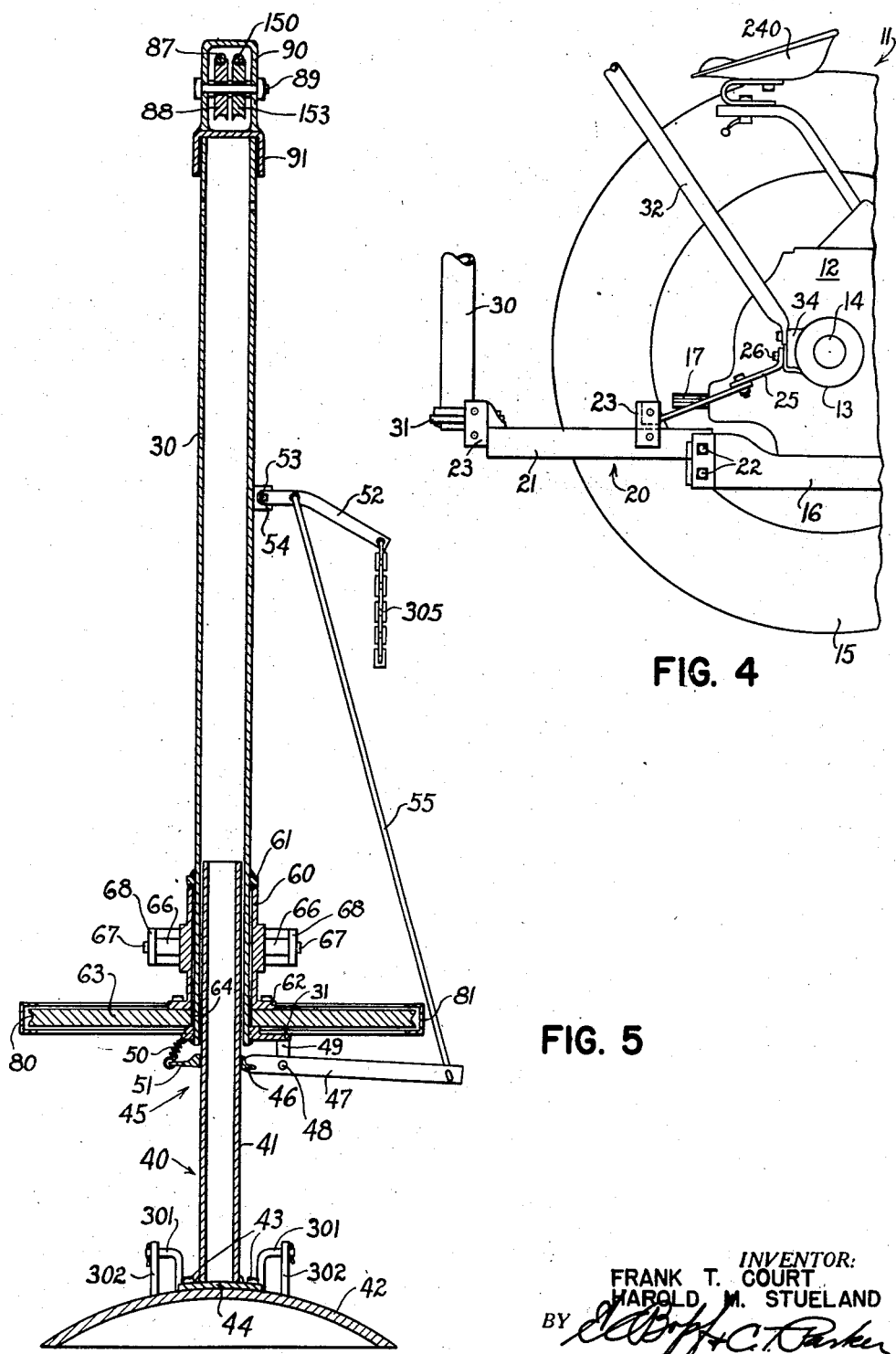
Figure 4 is a side elevational view of the framework shown in Figure 3.
Figure 5 is a sectional elevation taken along the axis of the mast and retractable ground support, as indicated by line 5—5 in Figure 2.

Referring now to the drawings, reference numeral 10 indicates in its entirety a detachable hoist, which is mounted on a tractor, indicated generally by reference numeral 11, only the rear end of which is shown in the drawings. The tractor 11 can be of any suitable conventional type and includes a centrally disposed body 12 having a pair of oppositely disposed laterally extending rear axle housings 13, from the outer ends of which project the tractor axles 14 on which are mounted the traction wheels 15. In Figures 2 and 4 the near traction wheel 15 is removed to more clearly show the elements of the invention. We do not intend our invention to be limited to the wheeled type of tractor, however, for after a consideration of the following description, one skilled in the art would have no difficulty in applying the detachable hoist to other types of tractors or vehicles. The tractor is provided with a more or less conventional drawbar frame including a pair of laterally spaced draft members 16 connected beneath the body of the tractor and extending rearwardly therefrom. The tractor is also provided with the usual splined power take-off shaft 17 extending rearwardly from the tractor body 12 and furnishes power from the tractor engine for driving implements associated therewith.

The joist 10 comprises a supporting framework 20 which includes a pair of longitudinally extending laterally spaced frame members 21 rigidly attached at their forward ends by means of bolts 22 to the rear end of the tractor drawbar frame member 16. The longitudinal frame members 21 are interconnected by a pair of fore and aft spaced transversely disposed frame members 23, and the latter are extended at one side of the tractor and are connected by a U-shaped frame member 24 disposed in a vertical plane and which serves as a bracing member to resist the reactive force of a clutch, as will be later described.

Thus, the frame 20 is generally rectangular and is supported in a substantially horizontal position by means of a pair of supporting braces 25 connected at their rear ends to one of the transverse frame members 23 and extending upwardly and forwardly therefrom, the forward ends of the supporting braces 25 being connected by bolts 26 to a pair of implement mounting bosses 27, respectively, which are customarily provided on the rear sides of the rear axle housings 13 of the tractor, for the purpose of supporting various kinds of agricultural and other implements thereon.

A vertically disposed cylindrical tubular mast 30 is welded at its lower end to a supporting plate 31, which is rigidly fixed to the rear transverse frame member 23. The upper end of the mast 30 is fixed in a vertical position by means of a pair of diagonal braces 32 extending downwardly and forwardly and diverging outwardly, the lower ends of the braces 32 being detachably fixed, as by bolts 33, to a pair of outer implement mounting bosses 34 on the rear side of the tractor axle housings 13, respectively.

During operation of the hoist the rear end of the frame 20 is supported on a retractable ground engaging support or spud 40 which comprises a vertical spindle 41 extending upwardly into the lower end of the tubular mast 30 in telescopic relation thereto, and rigidly fixed to the lower end of the spindle 41 is a concavo-convex ground engaging foot 42, which is fixed by bolts 43 to a plate 44 welded on the lower end of the spindle 41.

The spud 40 is readily shiftable vertically relative to the mast 30 between ground engaging position and transport position clear of the ground, and is held in any position of vertical adjustment by means of a locking device 45 comprising a collar 46 encircling the spindle 41 rather loosely, and is rigidly mounted on a lever arm 47 pivoted at 48 on a bracket 49 fixed to the lower side of the plate 31. Thus, the collar 46 is adapted to tilt about the axis 48 of support and although the spindle 41 is free to slide vertically through the collar 46 when the latter is disposed in a plane perpendicular to the axis of the spindle, the collar tends to bind on the spindle when it is tilted at an angle to the axis of the spindle.

When the spud 40 is in supporting position, as illustrated in Figure 5, the weight of the frame 20, mast 30, and other parts of the hoist, bears downwardly upon the arm 47 through the bracket 49 and thus tending to tilt the collar 46 into binding engagement with the spindle 41 and therefore permitting the spud 40 to share the load of the hoist with the connections of the frame on the tractor. Inasmuch as the spud is coaxial with the mast 30, most of the load is carried directly by the spud.

One of the advantages of this type of connection between the spud and the mast is that it is self-adjusting by virtue of an automatic jacking action which takes place as the spud tends to settle into soft ground. As will be readily appreciated, when a heavy load has been released from the hoist, the resilient action of the rubber tires on the tractor wheels 15 will cause the tractor frame and hence the mast 30, which is rigid therewith, to slightly rise and thus lift the arm 47 through the pivot connection 48, thereby tending to return the collar 46 into a plane more nearly perpendicular to the axis of the spindle 41. This releases the collar from its binding action on the spindle 41 and the weight of the latter causes the spud to settle into the mud or soft ground, whereupon it moves downwardly to a small extent relative to the mast 30, sliding through the collar 46 during this relative movement. As soon as another load is imposed upon the hoist, however, through the bracket 49 to the arm 47, the collar 46 immediately binds upon the spindle 41 in its new position. Thus it is evident that alternate loading and unloading of the hoist results in a jacking action of the collar 46 on the spindle 41 as long as the spud 40 tends to sink into the ground. A small coil spring 50 is connected between the plate 31 and an arm 51, extending from the collar 46 on the opposite side of the latter from the arm 47. The spring 50 biases the collar 46 toward a tilted or binding position on the spindle 41 and thus insuring that when the load is imposed upon the hoist the collar will have a positive clamping action upon the spindle.

When it is desired to release the spud from the clamping action of the collar 46 to permit the spud to be raised clear of the ground for purposes of transport, the arm 47 is raised by means of a manually operated lever 52 pivotally connected at 53 to a bracket 54 on the side of the mast 30, the lever 52 acting through a link rod 55 which is connected to the outer end of the lever arm 47. When the latter is raised, the collar 46 is swung into a plane perpendicular to the axis of the spindle, in which position the spindle slides readily therethrough.

After the spud has been raised, by means which will be described later, the hand lever 52 is raised still further to tilt the collar 46 in the opposite direction, after which the weight of the spud 40 causes the collar 46 to bind on the spindle and hold the latter in raised position, until the hand lever 52 is pressed downwardly once more, allowing the spud to drop by gravity into ground engaging position.

Embracing the lower end of the mast 30 is a sleeve 60 which is freely rotatable on the mast but which is prevented from moving axially upwardly by means of a ring 61 welded to the mast. The lower end of the sleeve 60 is provided with an outwardly turned flange 62, which rests upon and is rigidly fixed to a large circular disc 63, which has a centrally disposed aperture 64 receiving the lower end of the mast 30, and the disc 63 lies upon the supporting plate 31. A boom 65 is pivotally mounted at one end on the collar 60 by means providing for vertical swinging movement. The connecting means comprises a pair of trunnions 66 fixed to the collar 60 and extending laterally at opposite sides thereof and the outer ends of the trunnions 66 are provided with end portions 67 of reduced diameter, upon which are journaled a pair of brackets 68, respectively, and the opposite ends of the brackets 68 lie in juxtaposition with the inner end of the boom 65 and are rigidly fixed thereto. Thus, it is evident that by virtue of the trunnion bearing connection between the boom and the sleeve, the boom 65 is free to swing vertically, and since the sleeve 60 is rotatable on the mast 30, the boom 65 is likewise swingable horizontally about the vertical axis of the mast 30.

The boom 65 comprises a pair of structural channel members 65' disposed parallel to each other in laterally spaced relation with the flanges of the members turned outwardly. The channel members 65' are interconnected by a plurality of transverse interconnecting struts 69 rigidly fixed therebetween, as by welding.

The sleeve 60 and boom 65 are rotated about the axis of the mast 30 by means of a winding drum and clutch assembly 75, which comprises a pair of coaxially disposed winding drums 76, 77 adapted to be selectively rotated to wind or unwind a pair of cables 78, 79, respectively. The cable 78 extends from the winding drum 76 and lies in a groove 80 around the periphery of the disc plate 63 to which the lower flange 62 of the sleeve 60 is fixed, as best illustrated in Figure 5. The cable 79 extends from the winding drum 77 and passes across the top of the disc 63 and around a pulley 82, see Figure 1, which is suitably attached to the frame 20. From the pulley 82 the cable 79 passes around through the groove 80 of the plate 63 in the direction opposite to that of the cable 78. If desired, the two cables 78, 79 can be made as one integral piece, passing one or more times around the groove 80 and having the two ends thereof wound upon the two drums 76, 77. Thus, it is evident that when one of the drums is rotated to wind up its corresponding section of cable, the sleeve 60 is turned in one direction of rotation and thus causing the opposite end of the cable to be unwound from its respective winding drum. Conversely the boom can be swung in the opposite direction by applying power to wind the opposite portion of the cable upon its winding drum. The cables 78, 79 are held within the groove 80 by means of a shield 81 which extends peripherally around the edge of the disc 63 and is suitably supported on the frame 20.

The boom 65 is raised and lowered by means of a second winding drum and clutch assembly 85, which includes a cable winding drum 86 upon which is wound a cable 87. Further details of construction and means for mounting the assembly 85 will be described later. The cable 87 extends upwardly along the mast from the winding drum 86 and is trained over a pulley 88 at the top of the mast, which is journaled on a suitable bearing bolt 89 supported on a bracket 90 which is carried on the top of a swivel cap 91, which embraces the upper end of the mast 30 and is rotatable thereon. The cable 87 passes from the pulley 88 around another pulley 92 which is journaled on a bracket 93 fixed to the boom 65 near the outer end thereof. The cable 87 passes from the pulley 92 around a third pulley 94 which is journaled on a suitable bolt 95 carried at the outer end of a strut or arm 96, the inner end of which is pivoted by means of a bolt 97 to a lug 98 on the swivel cap 91. From the pulley 94 the cable 87 extends to the boom 65 and is connected thereto, as at 99. Hence, it is evident that by winding the cable 87 upon the winding drum 86 the boom 65 can be raised. The purpose of the arm 96 is to serve as a stop member for limiting the upward movement of the boom 65, but more particularly to provide a lever arm for turning the swivel cap 91 on the upper end of the mast 30 to maintain the pulley 88 in alignment with the pulley 92 on the boom. When the boom is swung horizontally, the cable acts through the pulley 94 and arm 96 to swing the swivel cap 91 about the axis of the mast 30.

The boom 65 serves as a track for a carriage 105, which carries the material handling bucket 106. The bucket 106 has a scoop bottom 107 provided with a forward scraping edge 108 and having side plates 109 and a back wall 110. The particular embodiment shown and described herein is especially adapted for farm use as a manure loader and to this end the bucket 106 is provided with a plurality of laterally spaced teeth 111 extending forwardly from the bottom of the bucket and having sharpened forward ends for digging into the material to be lifted.

We do not intend our invention to be limited to any one particular use, however, and the shape of the bucket can be varied, as known to those skilled in the art, to adapt the machine for any excavating or loading operation within its capacity. In so far as the details of construction described hereinbefore are concerned, the carriage 105 and bucket 106 can even be dispensed with and the machine can be used as a simple derrick or hoist.

Figure 6:
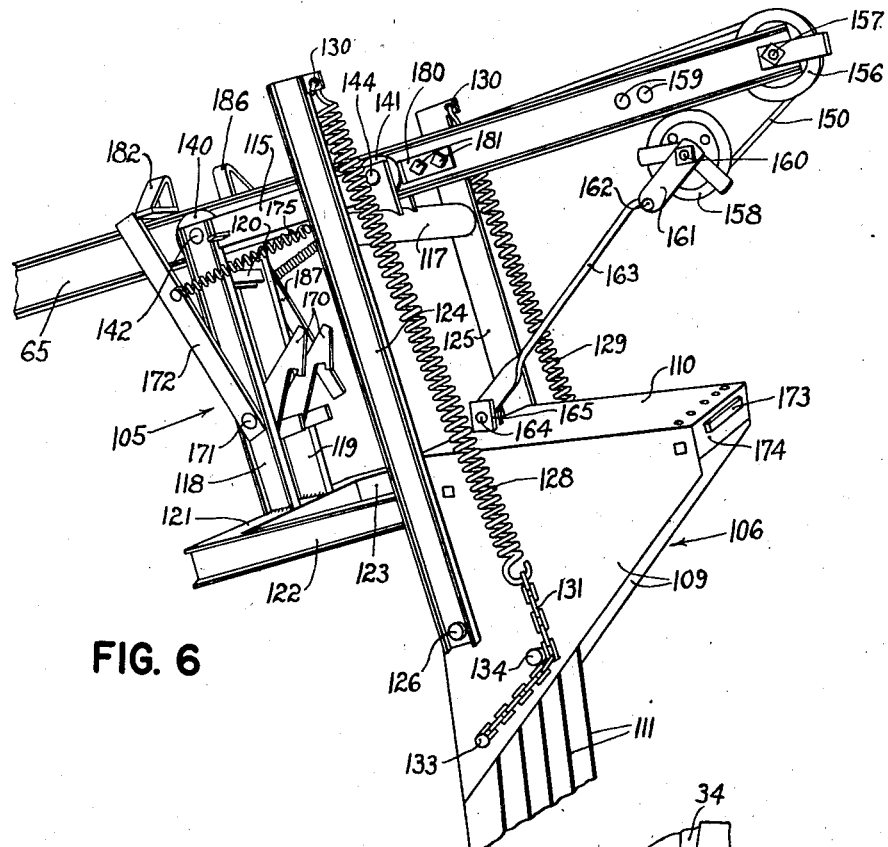
Figure 6 is a perspective view drawn to an enlarged scale of the bucket and carriage in dumping position at the end of the boom.
Figure 3:
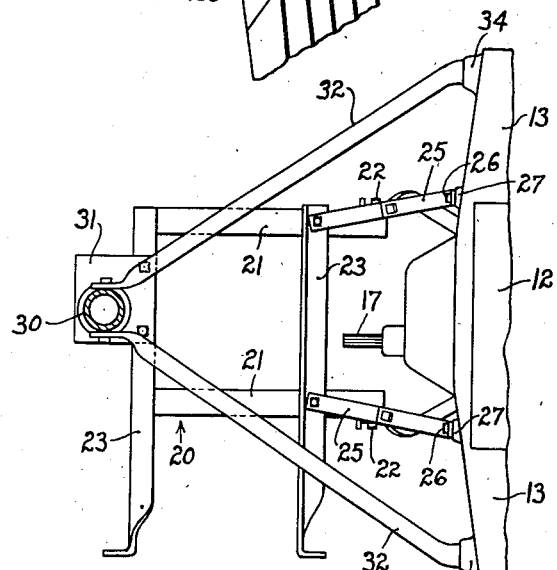
Figure 3 is a plan view of the supporting framework of the hoist and showing its manner of connection to a tractor.
Figure 7:
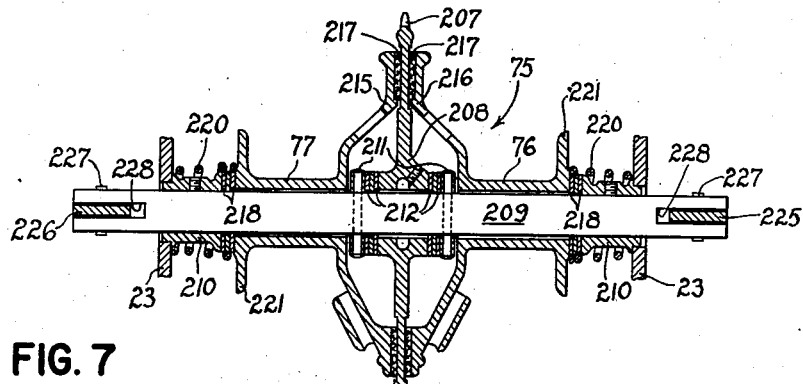
Figure 7 is a sectional view taken along the axis of the clutch and winding drum assembly, which controls the horizontal swinging of the boom about the axis of the mast, as indicated by line 7—7 in Figure 2, and drawn to an enlarged scale.

The carriage 105 consists of a structural framework and comprises a four-wheeled truck including a pair of parallel truck frame members 115, 116 disposed adjacent the boom 65 along opposite sides thereof, respectively. The outer ends of the members 115, 116 are welded rigidly to a transversely disposed pipe frame member 117 which extends underneath the boom 65, and the inner ends of the frame members 115, 116 are welded to a pair of downwardly extending frame members 118, 119, respectively, the latter being rigidly interconnected by a transverse frame member 120 disposed below the boom 65. The lower ends of the downwardly extending members 118, 119 are rigidly welded to the central portion 121 of a U-shaped frame element which has a pair of laterally spaced side arms 122, 123 extending outwardly parallel to the boom 65. The outer ends of the arms 122, 123 are welded rigidly to a pair of generally vertically disposed frame members 124, 125, respectively, which are also rigidly fixed, as by welding, to the opposite ends of the pipe frame member 117, respectively. The vertically disposed members 124, 125 extend below the arms 122, 123 and are apertured at their lower ends to receive the trunnions 126, which extend outwardly from opposite sides of the bucket 106. The trunnions 126 serve to support the bucket 106 on the carriage 105 for vertical swinging movement about the transverse axis of the two aligned trunnions 126, and the bucket is biased toward a normal carrying position, see Figure 2, in which the bottom 107 and teeth 111 of the bucket are generally parallel to the boom 65, by means of a pair of coil springs 128, 129 disposed on opposite sides of the bucket, respectively, and connected at their upper ends to brackets 130 which are fixed to the upper ends of the vertical frame members 124, 125, the latter being extended above the boom 65 for this purpose. The lower ends of the springs 128, 129 are connected to chains 131, 132, respectively, which are anchored to the sides of the bucket 106 by means of bolts 133 spaced outwardly from the trunnions 126. When the bucket 106 is swung downwardly about the axis of the trunnions 126 into dumping position, as shown in Figure 6, the springs 128, 129 are stressed in tension and the chains 131, 132 train over a pair of lugs 134 on the sides 109 of the bucket 106 which serve to prevent the springs 128, 129 from approaching a dead-center position over the axis of the trunnions 126 and thus defeat the purpose of the springs to raise the bucket to carrying position.

The carriage 105 is supported on the boom 65 by means of two pairs of wheels 140, 141, which fit within the channel members 65' of the boom 65 and have a diameter slightly less than the distance between the flanges of the channel members and are thus adapted to roll on either of the flanges, depending upon the direction of pressure of the carriage upon the boom. The inner pair of rollers or wheels 140 is disposed on opposite sides, respectively, of the boom 65 and each of the wheels is journaled on a trunnion 142, 143, respectively, fixed to the inner end of each of the truck frame members 115, 116. The outer pair of wheels 141 is journaled on a pair of trunnions 144, respectively, fixed at the outer ends of the truck frame members 115, 116.

The carriage is moved inwardly along the boom 65 by the force of gravity when the boom is in a slightly raised position, and therefore it is necessary to slightly raise the boom in order to lower the carriage along the boom. The carriage is pulled outwardly along the boom by means of a cable 150. It is wound upon a winding drum 151, which is part of a combined clutch and winding drum assembly 152, the details of construction of which will be described later. The cable 150 passes from the drum 151 upwardly along the mast and over a pulley 153, which is journaled on the bolt 89 on the swivel cap 91 at the top of the mast 30. The cable 150 extends downwardly along the opposite side of the mast 30 and is trained around a pulley 154, which is disposed between the two channel members 65' of the boom 65 and journaled on a transverse bolt 155. The cable 150 then extends outwardly between the boom members 65' and is trained over a pulley 156 at the outer end of the boom, which is journaled on a transverse bolt 157. The cable 150 is then trained around a pulley 158 on the bucket and the end of the cable is securely fastened to the end of the boom by bolts 159. The pulley 158 is journaled on a bolt 160 in a clevis 161, which is pivotally connected by means of a bolt 162 to a link 163. The opposite end of the link 163 is pivoted by means of a bolt 164 to a bracket 165 which is rigidly attached to the back wall 110 of the bucket 106 near the lower end thereof.

Normally, the bucket 106 is locked in carrying position by means of a retaining device comprising a pair of latch hooks 170, which are rigidly mounted on a transverse shaft 171 which is journaled at opposite ends thereof in the vertical frame members 118, 119, respectively. A control arm 172 is welded or otherwise rigidly fixed to the outer end of the shaft 171 beyond the vertical member 118 and extends upwardly therefrom to a point above the boom 65. The latch hooks 170 are adapted to engage a lug 173 fixed on the top of a transversely disposed frame member 174 which extends along the upper edge of the top and sides of the bucket 106. The latch hooks 170 are biased toward engaged position by means of a tension spring 175, which is connected between the control arm 172 and the truck frame member 115.

When the bucket is latched in normal carrying position in the carriage, the link 163 lies against the back wall 110 and terminates just behind the latch lug 173, so that the clevis 161 lies upon the lug 173 between the latch hooks 170 and positions the pulley 158 over the bucket 106. Thus, an outward pull on the cable 150, which is accomplished by winding the cable upon the drum 151, effects an outward movement of the carriage on the boom 65 and the pull of the cable also tends to overturn the bucket 106 into the dumping position by virtue of the connection of the link 163 to the bottom of the bucket at a point offset from the axis of the supporting trunnions 126. This tendency for the bucket to be overturned is resisted by the latch 170, which is held in latched position by the spring 175, until the carriage reaches the end of its travel at the outer end of the boom 65, as defined by means of a pair of stop members 180 disposed on opposite sides of the boom 65 and rigidly bolted to the webs of the boom members 65' by bolts 181 extending through aligned apertures in the boom members 65' and stop members 180, respectively. Thus, the stop members 180 are in a position to engage the outer pair of carriage rollers 141 to prevent any further travel outward of the carriage along the boom.

The control lever 172 also engages a stop member 182 in this position of the carriage, with the result that when the carriage engages the stops 180 the latch hooks 170 have been disengaged from the latch lug 174, whereupon further exertion of pulling force through the cable 150 acts through the link 163 to overturn the bucket into dumping position, as indicated in Figure 6. When the cable 150 is then relaxed, the springs 120, 129 swing the bucket back into carrying position. Therefore, it is now clear that the bucket is swung into dumping position by force exerted through the same power transmitting connections which propel the carriage outwardly and upwardly along the boom 65, and after the carriage has reached the limit of its travel, the bucket can be oscillated about the axis of the trunnions 126 by alternately releasing and tightening the cable 150. This action is useful in handling manure, as it has a tendency to adhere to the bucket and frequently requires the bucket to be shaken to dislodge the load therein.

During the shaking operation, the carriage 106 is automatically locked in its terminal position by means of a latch hook 185 which is swingably mounted on a trunnion bolt 143 and engages a stop 186 fixed to the upper side of the boom 65 approximately opposite to the stop 182. A control arm 187 is rigidly fixed to the latch hook 185 and extends downwardly therefrom behind the back wall 110 of the bucket 106 and is engaged by the latter when in carrying position to swing the latch 185 out of engagement with the stop 186 and thus providing that the carriage is only locked in its terminal position during the time that the bucket 106 is out of its carrying position. The latch 185 is biased toward locking position by means of a spring 188 which is connected in tension between the control arm 187 and the truck frame member 116. The stop member 186 is so spaced on the boom that the carriage 105 must roll inwardly on the boom a few inches from its terminal position against the stops 180, with the result that when the cable 150 is relaxed untightened to shake the load from the bucket, the carriage moves back and forth on the boom slightly, hitting the stops 180 with a slight jar to assist in shaking the load from the bucket.

Power is transmitted from the tractor engine to control the winding drums 78, 86, 151, through the power take-off shaft 17 on which is mounted a sprocket 190. The sprocket 190 is connected by a driving chain 191, to drive a sprocket 192 on the forward end of a drive shaft 193. The rear end of the drive shaft 193 is journaled in a bearing 194 which is connected by bolts 195 to a plate 196, rigidly welded on the side of the mast 30. The forward end of the drive shaft 193 is supported in a journal bearing 197 which is carried on a framework 198 comprising a pair of laterally spaced vertical frame members 199 welded at their lower ends to the transverse frame member 23 and interconnected by a transversely disposed plate member 200 upon which the journal bearing 197 is mounted. The drive sprocket 192 is journaled on the drive shaft 193, driving relation being established through a conventional overload release clutch 201.

Power is supplied from the drive shaft 193 to the combined clutch and winding drum assembly 75 through a chain 205 which is connected between a sprocket 206 on the drive shaft 193 and a sprocket 207 which is included in the assembly 75. The sprocket 207 is provided with a hub member 208 which is journaled on a shaft 209, the latter being supported in a pair of sleeves 210 on the front and rear transverse frame members 23, respectively. The shaft 209 is slidable axially in the sleeves 210, but is non-rotatable relative thereto. The sprocket hub 208 freely rotates on the shaft 209 but is held against axial sliding movement thereon by a pair of pins 211 disposed at opposite ends of the hub 208 and extending through suitable apertures in the shaft 209. A plurality of washers 212 are disposed between the pins 211 and the hub 208. Each of the winding drums 76, 77 is provided with a clutch member 215, 216, respectively, preferably formed integral therewith. Each of the clutch members 215, 216 is provided with an annular clutch lining 217. The two clutch linings 217 are disposed on opposite sides of the sprocket wheel 207 and are engageable therewith. Thus a driving relation between the sprocket 207 and either of the clutch members 215, 216 can be established by shifting the shaft 209 in one direction or another and thus acting through the pins 211 and washers 212 to force the sprocket 207 into engagement with one or the other of the clutch linings 217, and in this way driving either of the winding drums 76, 77 selectively. The reaction of the clutch members 215, 216 is transmitted through the sleeves 210 to the rigid frame members 23 and the proper spacing is secured by a number of washers 218 between the sleeves 210 and the winding drums 76, 77, respectively. The clutch members 215, 216 are maintained slightly in engagement with the sprocket 207 at all times by a pair of coil springs 220 which encircle the sleeves 210 and press against an annular flange 221 at the outer end of each of the drums 76, 77, and react against the frame members 23. This light pressure of the springs is not sufficient to cause undue wear of the clutch linings 217 but is just sufficient to maintain a slight torque upon the drums 76, 77 to take up the slack in the cables 78, 79.

The shaft 209 is shifted axially in either direction to engage the clutches, by means of a pair of actuating levers 225, 226, which are pivotally connected at opposite ends, respectively, of the shaft 209 by pins 227, each of the actuating levers passing through a slot 228 in the ends of the shaft 209. The actuating lever 225 is fulcrumed on a bracket 230. A foot-operated pedal 231 is connected by a suitable link 232 to the actuating lever 225 and is loosely mounted on a rock shaft 233, the latter being journaled in suitable supports on the forward frame member 23. The actuating lever 226 is fulcrumed on a bracket 235 fixed to the rear frame member 23 and is connected by a link 236 to an arm 237 fixed on the rock shaft 233. The rock shaft 233 is rocked by means of a foot pedal 234 fixed thereto at the opposite end of the rock shaft.

The foot pedals 231, 234 are disposed in positions which are convenient to the tractor operator sitting in the tractor seat 238, which is provided with an adjustment 238' by which it can be reversed on its support 239 to permit the operator to face rearwardly instead of forwardly. The pedal 231 is adapted to receive the operator's left foot and the pedal 234 is adapted to receive the operator's right foot. When the pedal 234 is depressed, the arm 237 is swung rearwardly, acting through the link 236 and actuating lever 226 to shift the shaft 209 rearwardly and thus shift the sprocket 207 into engagement with the clutch 215 and thus driving the winding drum 77 to wind the cable 79 thereon and thus swinging the boom counterclockwise, as viewed in Figure 1. Conversely, when the pedal 231 is depressed it acts through the link 232 and actuating lever 225 to shift the shaft 209 forwardly relative to the tractor to engage the sprocket 207 with the clutch member 216, thus driving the winding drum 76 and exerting a pull on the cable 78 to swing the boom in a clockwise direction.

The combined winding drum and clutch assemblies 85, 152, which control the raising and lowering of the boom 65, and the movement of the carriage along the latter, respectively, are disposed in a fore and aft extending position above and on opposite sides, respectively, of the drive shaft 193. Each of the assemblies 85, 152 is journaled on a shaft 240, 241, respectively, the rear end portions of which are reduced in diameter and threaded, as indicated as 242 in Figures 8 and 9, and are inserted through laterally spaced apertures 243 in a transversely disposed bracket plate 244 which is rigidly attached to the mast 30 directly above the bracket 196 for the power shaft 193. The threaded end portions 242 are rigidly secured to the plate 244 by nuts 245. The opposite ends of the shafts 240, 241 are also provided with a threaded portion 246 of reduced diameter, which are inserted through a pair of laterally spaced apertures 247 in a transversely disposed frame member 248 which is rigidly connected between the upper end of the vertical frame members 199 of the supporting framework 198. A pair of nuts 250 secure the forward ends of the shafts to the frame member 248. Each of the winding drums 86, 151 comprises a unitary casting having an outwardly flared portion 251 at the forward end thereof, serving as a support for the clutch lining 252, which is secured thereto by rivets 253.

Each of the winding drum castings 86, 151 is provided with an axially disposed recess 255 at one end thereof having a conical surface serving as a brake drum for the winding drum. This brake drum 255 is adapted to cooperate with a truncated conical brake shoe 256 which is keyed to a sleeve 257 embracing the shaft 240, 241 of each of the assemblies 85, 152, respectively. The brake shoe supporting sleeve 257 is slidable axially along the shaft 241 to engage the shoe 256 with the brake drum 255 or to release it therefrom. The sleeve 257 is prevented from rotating relative to the shaft 241 by means of an inwardly extending lug 258 serving as a spline which slides over a flattened portion 259 of the shaft 241. An actuating arm 260 is fixed to the end of the sleeve 257 and engages a notch 261 provided in the lower end of the respective control lever 262, 263. Each of the levers 262, 263 is pivotally supported at 264 on a supporting sleeve 265 which is mounted on the shaft 241.

In the assembly 152 for controlling the carriage, the movable clutch member indicated generally by reference numeral 270, comprises a dished web having a radially disposed flange 271 adapted to engage the clutch lining 252. The web is supported upon and preferably formed integral with a cylindrical hub 272 which is journaled on the brake sleeve 257. The hub 272 is not only free to rotate on the sleeve 257, but is slidable axially thereon over a limited range of movement, as limited by a raised flange 273 at the outer end of the sleeve 257. The movable clutch member 270 is driven by a sprocket 274 which embraces the hub 272 and is rigidly bolted to the web by means of bolts or pins 275.

The movable clutch element 270 of the clutch assembly 152 is driven by means of a power transmitting chain 276 which interconnects the sprocket 274 with a sprocket 277 on the drive shaft 193. The clutch is engaged by means of a cam 278 fixed to the edge of the lever 263 and which is adapted to engage a bearing ring 279 which transmits a force exerted through the lever 263 and cam 278 to the forward end of the hub member 272 and thereby pressing the clutch flange 271 against the clutch lining 252, whereupon the winding drum 151 is driven by power transmitted through the sprocket 274. A number of thrust washers 280 are provided between the bearing ring 279 and hub 272 and the number of these may be varied to adjust the throw of the control lever 263. Thrust washers 281 are also provided between the rear end of the winding drum 151 and the bracket plate 244. Thus it is evident that by throwing the control lever 263 in a counterclockwise direction about the pivot 264, as viewed in Figure 8, the cam 278 engages the ring 279 which moves the clutch member 270 into engagement with the clutch lining 252, thus winding up the cable 150, which holds the carriage 105 toward the outer end of the boom 65. When the lever 263 is returned to a vertical position, as shown in Figure 8, the clutch is disengaged but the brake has not yet been applied and therefore the carriage 105 is free to slide downwardly on the boom under the force of gravity. The downward movement of the carriage on the boom is arrested by throwing the lever 263 in a clockwise direction, as viewed in Figure 8, whereupon the lever acts through the notch 261 and arm 260 to force the sleeve 257 toward the left and thus pressing the brake shoe 256 into engagement with the brake drum 255 and holding the winding drum 151 against movement in either direction.

The movable clutch member 285 in the assembly 85, which controls the raising and lowering of the boom 65, comprises a clutch disc 286 which is mounted on a sleeve 287 journaled on the brake sleeve 257. The clutch disc 286 is adapted to engage the clutch lining 252 on the flange 251 and is provided at its outer periphery with a plurality of sprocket teeth 288 which receive a driving chain 289 through the agency of which power is transmitted from the drive shaft 193 through a sprocket 290 on the latter. Each of the levers 262, 263 is provided with a short section 291 on the opposite side of the mounting sleeve 265 and is connected thereto by suitable bolts 292. The shaft section 291 is provided with a cam 278 diametrically opposite to the similar cam on the control lever 262, 263, so that an equal pressure on both sides of the bearing ring 279 is effected by a movement of the lever.

The boom 65 is raised by swinging the control lever 262 in a counterclockwise direction about the bolt 264, as indicated in Figure 9, and thus acting through the cams 278 and the bearing ring 279 to force the movable clutch member 285 against the clutch lining 252 on the winding drum flange 251. With the lever 262 vertical, the clutch is disengaged, as well as the brake shoe 256 and thus permits the boom 65 to lower by the force of gravity. The boom is held in any position by swinging the clutch lever 262 in a clockwise direction, as viewed in Figure 9, and thus acting through the arm 260 against the sleeve 257 to force the brake shoe 256 into engagement with the brake drum 255.

The operating levers 262, 263 are conveniently disposed near the operator's seat 240 so that they may be held at all times in the operator's left and right hands, respectively, affording him complete control over the vertical movement of the boom and the travel of the carriage thereon, while the horizontal swinging of the boom is controlled by the operator's feet, as has been above described.

During transport the operator drives the tractor with the hoisting device mounted thereon and the spud 40 held in raised or transport position, to the location at which the work is to be done. After placing the tractor in the desired position, the operator reverses his seat 240 on the seat support 242 and lowers the spud 40 by pressing downwardly on the hand control lever 52 and thus swinging the binding ring 46 into a horizontal position in which the spindle 41 will slide through the ring or collar 46. The bucket is then loaded by lowering the boom 65 into a substantially horizontal position and then moving the bucket and carriage outwardly thereon. When the bucket is filled in this manner, its travel is stopped before it reaches the stop 180 at the end of the boom, and the latter is then raised and swung horizontally to the position in which the material is to be dumped. The carriage is then run to the limit of its travel, whereupon the bucket is dumped in the manner described heretofore, after which the carriage is returned to the lower end of the boom and the latter is swung back to the loading position once more. When it is desired to move the tractor to another location, the spud 40 is raised in the following manner: The boom 65 is lowered to its lowest position and the spud is then connected thereto by means of a hook 300 comprising a pair of laterally spaced rods having their ends turned outwardly at 301 to form aligned pivots which are inserted into spaced bracket members 302, which are rigidly fixed to the foot 42 of the spud 40. The opposite ends of the rods 300 are provided with curved hook portions 303 which are adapted to hook over a transverse lifting member 304 which is rigidly secured, as by welding, to the under side of the boom 65 and extends laterally on opposite sides thereof. The hook 300 is controlled from the operator's seat by means of a chain 305 by which the operator can raise the hook to engage the member 304. The upper end of the chain 305 is attached to the lever 52 for the operator's convenience so that it is always within reach. After the hook 300 has been engaged with the boom member 304, the boom is raised in the usual manner and thus exerting a lifting force on the spud 40. Before the spud can be lifted, however, it is necessary to raise the lever 52 in order to swing the clamping collar 46 into a horizontal position to release the spindle 41. While it is thus possible to hold the spud in raised position by the clamping collar 46, it is preferable to leave the hook 300 engaged with the member 304 on the boom 65 during transport to insure that the spud is not released and dropped due to the jarring during movements of the tractor.

We do not intend our invention to be limited to the exact details shown and described in connection with this embodiment, but only as set forth in the claims which follow.

We claim:

1. A detachable hoist for a tractor having a body, a pair of oppositely disposed rear axle housings provided with implement supporting means and a power take-off shaft projecting rearwardly from said body, said hoist comprising in combination, a framework adapted to be mounted on said rear axle housings behind said tractor, a mast supported on the rear of said framework in a vertical position, a pair of winding drums disposed with their axes extending generally fore and aft, bearing means mounted on said framework for supporting the forward ends of said drums, bearing means mounted on said mast for supporting the rear ends of said drums, and power transmitting means for connecting said drums with said tractor power take-off shaft.

2. A detachable hoist for a tractor having a body, a pair of oppositely disposed rear axle housings provided with implement supporting means and a power take-off shaft projecting rearwardly from said body, said hoist comprising in combination, a framework adapted to be mounted on said rear axle housings behind said tractor, a mast supported on the rear of said framework in a vertical position, a pair of winding drums disposed with their axes extending generally fore and aft, bearing means mounted on said framework for supporting the forward ends of said drums, bearing means mounted on said mast for supporting the rear ends of said drums, a power shaft disposed parallel with said drums and supported in suitable bearings carried on said frame, detachable means for operatively connecting said power shaft with said tractor power take-off shaft, and flexible endless power transmitting means trained over said power shaft and each of said drums, respectively, for driving the latter.

3. A detachable hoist for a tractor, comprising in combination, a frame adapted for connection to the tractor frame and including a mast fixedly mounted relative to the tractor, a boom mounted on said mast by means providing for vertical and horizontal swinging movement relative thereto, mechanism mounted on said frame and operatively connected to receive power from the tractor engine for lifting and swinging said boom, and a ground engageable spud telescopically related to said mast and shiftable vertically relative to said frame and to said boom and having means for adjustably fixing said spud to said frame for supporting the latter.

4. In a hoist, the combination of a tubular mast, a ground engageable spud having a spindle disposed in telescoping relation within said mast and shiftable vertically relative thereto, a sleeve embracing said mast and rotatable relative thereto, and a boom pivotally connected to said sleeve for vertical swinging movement relative thereto.

5. A hoist comprising a frame, a tubular mast rigidly supported thereon, a ground engageable spud having a spindle disposed in telescoping relation within said mast and shiftable vertically relative thereto, a sleeve journaled on said mast and rotatable relative thereto but having means preventing axial shifting movement of said sleeve on said mast, a boom pivotally connected to said sleeve for vertical swinging movement relative thereto, means for swinging said boom vertically and means for rotating said sleeve about said mast.

6. A hoist comprising a frame, a mast rigidly fixed thereto, a boom connected with the lower portion of said mast by means providing for vertical and horizontal swinging movement relative thereto, a winding drum supported on said frame, a swivel cap mounted on the upper end of said mast, a pulley journaled on said cap, a cable wound on said drum and extending over said pulley, a pulley on said boom over which said cable is trained, a second pulley attached to said cap eccentric of the axis of swiveling movement over which said cable is trained, and means for attaching said cable to said boom, said second pulley being operative to swing said cap to align the pulleys mounted thereon with said pulley on the boom, when the latter is swung horizontally.

7. A hoist comprising a frame, a mast rigidly fixed thereto, a boom connected with the lower portion of said mast by means providing for vertical and horizontal swinging movement relative thereto, a winding drum supported on said frame, a swivel cap mounted on the upper end of said mast, a pulley journaled on said cap, a cable wound on said drum and extending over said pulley, a pulley on said boom over which said cable is trained, an arm attached to said cap and movable therewith about the axis of said mast, a pulley on said arm over which said cable is trained, and means for attaching said cable to said boom, said pulley being mounted on said arm eccentric of the axis of swiveling movement of said cap, whereby the full force of the load on said cable is transmitted through said arm to swing said cap to align the pulleys mounted thereon with said pulley on the boom, when the latter is swung horizontally.

8. A detachable hoist for a tractor having a body, a pair of oppositely disposed rear axle housings provided with implement supporting means, and a power take-off shaft projecting from said body, said hoist comprising in combination, a framework adapted to be mounted on said rear axle housings, a mast supported on said framework in a vertical position, bracing means fixed to said mast and adapted for connection to said axle housings at laterally spaced points, a winding drum having a supporting bearing fixed to said mast, a boom, means for swingably mounting said boom on said mast, a swivel cap mounted at the upper end of said mast, a pulley journaled on said cap, a cable wound on said drum and trained over said pulley and operatively connected with said boom, and a detachable power transmitting connection between said drum and said tractor power take-off shaft.

9. A detachable hoist for a tractor, comprising in combination, a cylindrical mast, a supporting frame fixed to said mast and adapted for detachable connection to the tractor, a ground engageable spud telescopically related to said mast and shiftable vertically relative thereto, a boom, means for mounting said boom on said mast providing for swinging movement of said boom about the axis of said mast, a swivel cap mounted at the upper end of said mast, a pulley journaled on said cap, a second pulley attached to said cap eccentric to the axis of swiveling movement of the latter, and a cable trained over said pulleys and connected with said boom.

10. In a portable hoist, a wheel supported frame, a boom pivotally supported on said frame for vertical swinging movement relative thereto, means for swinging said boom, a vertically shiftable ground engageable spud, means fixing said spud relative to said frame in adjusted positions, and means for optionally connecting said spud to said boom for lifting the spud by swinging the boom vertically.

11. In a portable hoist, a wheel supported frame, a tubular mast carried thereby, a ground engageable spud having a spindle telescopically related to said mast, a boom pivotally mounted on said frame for vertical movement relative thereto, means for swinging said boom vertically, and means for optionally connecting said spud to said boom for lifting the spud by swinging the boom vertically.

12. In a portable hoist, a wheel supported frame, a tubular mast carried thereby, a ground engageable spud having a spindle telescopically related to said mast, a boom pivotally mounted on said frame for vertical movement relative thereto, means for swinging said boom vertically, and a hook swingably attached to said spud and engageable with said boom for lifting the spud by swinging the boom vertically.

13. In a portable hoist, a wheel supported frame, a tubular mast carried thereby, a ground engageable spud having a spindle telescopically related to said mast and shiftable vertically relative thereto, and means for holding said spud in vertically adjusted position comprising a collar loosely encircling said spindle and means for pivotally attaching said collar to said frame on an axis generally perpendicular to said spindle and in offset relation to the major axis thereof, said collar being adapted to bind on said spindle when tilted about said perpendicular axis.

14. In a portable hoist, a frame, a support thereon, a ground engageable spud having a supporting spindle engaging said support and slidable vertically relative thereto, and means for holding said spud in adjusted position comprising a collar loosely encircling said spindle and adapted to bind on the spindle when the collar is tilted relative thereto, and means providing for said relative tilting action, for attaching said collar to said frame.

15. In a portable hoist, a frame, a tubular mast carried thereby, a ground engageable spud having a spindle telescopically related to said mast, a boom pivotally mounted on said frame for vertical movement relative thereto, means for swinging said boom vertically, means for optionally connecting said spud to said boom for lifting the spud by swinging the boom vertically, and means for holding said spud in adjusted position comprising a collar loosely encircling said spindle and adapted to bind on the spindle when the collar is tilted relative thereto, and means providing for said relative tilting action, for attaching said collar to said frame.

16. In a portable hoist, a frame, a tubular mast carried thereby, a ground engageable spud having a spindle telescopically related to said mast, a boom pivotally mounted on said frame for vertical movement relative thereto, means for swinging said boom vertically, means for optionally connecting said spud to said boom for lifting the spud by swinging the boom vertically, and means for holding said spud in adjusted position comprising a collar loosely encircling said spindle and adapted to bind on the spindle when the collar is tilted relative thereto, and means for pivotally attaching said collar to said frame about an axis generally perpendicular to said spindle and in offset relation thereto.

17. In combination with a tractor having a mobile body and an operator's seat disposed adjacent the rear end thereof, for supporting an operator in position to drive the tractor forwardly, a hoist comprising a framework mounted on the rear of said tractor body behind said seat, a generally vertical mast mounted on said framework, hoisting mechanism carried by said mast, a pair of winding drums for operating said mechanism, said operator's seat being mounted on said tractor by means providing for reversing the same to face rearwardly, said drums being disposed between said mast and said framework in laterally spaced arrangement, each drum having a bearing support on said mast and a second bearing support on said framework, a clutch associated with each of said drums, and a manual control lever for each of said clutches extending within convenient reach of an operator's two hands when he is sitting in the reversed seat facing rearwardly.

18. In combination with a tractor having a mobile body and an operator's seat disposed adjacent the rear end thereof, for supporting an operator in position to drive the tractor forwardly, a hoist comprising a framework mounted on the rear of said tractor body behind said seat, a generally vertical mast rigidly mounted on said framework, a boom mounted on said mast by means providing for vertical and horizontal swinging movement, a hoisting member supported on said boom, a pair of winding drums disposed with their axes extending fore and aft between said mast and said tractor body, bearing means mounted on said mast for supporting the rear ends of said drums, means carried by said frame for supporting the forward ends of said drums, cables on said drums for controlling movements of said boom and hoisting member, respectively, a pair of laterally spaced clutches associated with said drums, respectively, and a pair of laterally spaced manual control levers for operating said clutches, said operator's seat being reversibly mounted on said tractor, whereby the operator can sit thereon facing rearwardly and control said levers.

19. In combination with a tractor having a mobile body and an operator's seat disposed adjacent the rear end thereof, for supporting an operator in position to drive the tractor forwardly, a hoist comprising a framework mounted on the rear of said tractor body behind said seat, a generally vertical mast rigidly mounted on said framework, a boom mounted on said mast by means providing for vertical and horizontal swinging movement, a hoisting member supported on said boom, a pair of winding drums disposed with their axes extending fore and aft between said mast and said tractor body, bearing means mounted on said mast for supporting the rear ends of said drums, means carried by said frame for supporting the forward ends of said drums, cables on said drums for controlling movements of said boom and hoisting member, respectively, a pair of laterally spaced clutches associated with said drums, respectively, and a pair of laterally spaced manual control levers for operating said clutches, mechanism for swinging said boom laterally including a pair of clutches for controlling said mechanism, and a pair of laterally spaced foot pedals, said operator's seat being reversibly mounted on said tractor, whereby the operator can sit thereon facing rearwardly in convenient position to operate said hand levers and said foot pedals, simultaneously.

20. A detachable hoist for a tractor having a mobile body and a power take-off shaft extending rearwardly therefrom, comprising a framework adapted to be supported on the rear of said body, hoisting mechanism comprising a mast rigidly mounted on the rear of said frame, a transverse support fixed to said mast, a pair of winding drums disposed side by side ahead of said mast and having bearings supported on said transverse member, a power shaft on said frame, bearing means for supporting said power shaft on said mast, means for supporting the opposite ends of said drums and power shaft on said framework, power transmitting means connecting said shaft with said drums, and a flexible endless power transmitting member connecting said power shaft with said power take-off shaft.

21. A detachable hoist for a tractor having a body carried on a pair of laterally spaced rear traction wheels, comprising in combination, a framework having means for supporting the same on the rear end of said body between said wheels, a generally vertical mast fixed to said frame at a point spaced rearwardly away from said body, a pair of winding drums disposed with their axes extending fore and aft between said mast and said tractor body, bearing means mounted on said mast for supporting the rear ends of said drums, means carried by said frame for supporting the forward ends of said drums, and means for connecting said drums with the tractor engine to be driven thereby.

22. A detachable hoist for a tractor having a body carried on a pair of laterally spaced rear traction wheels, comprising in combination, a framework having means for supporting the same on the rear end of said body between said wheels, a generally vertical hollow cylindrical mast fixed to said frame at a point spaced rearwardly away from said body, a pair of winding drums disposed with their axes extending fore and aft between said mast and said tractor body, bearing means mounted on said mast for supporting the rear ends of said drums, means carried by said frame for supporting the forward ends of said drums, means for connecting said drums with the tractor engine to be driven thereby, and a ground engageable spud having a supporting stem telescopically related with said mast and adjustable vertically relative thereto.

23. A detachable hoist for a tractor having a body, a pair of oppositely disposed rear axle housings provided with implement supporting means, and a power take-off shaft projecting from said body, said hoist comprising in combination, a framework adapted to be mounted on said rear axle housings, a mast supported on said framework in a vertical position, bracing means fixed to said mast and adapted for connection to said axle housings at laterally spaced points, a winding drum having a supporting bearing fixed to said mast, a boom, means for swingably mounting said boom on said mast, a ground engageable spud telescopically related to said mast and shiftable vertically relative thereto and to said boom, a swivel cap mounted at the upper end of said mast, a pulley journaled on said cap, a cable wound on said drum and trained over said pulley and operatively connected with said boom, and a detachable power transmitting connection between said drum and said tractor power take-off shaft.

24. In a portable hoist, a frame, a support thereon, a ground engageable spud having a supporting spindle engaging said support and slidable vertically relative thereto, and means for holding said spud in adjusted position comprising a collar loosely encircling said spindle and adapted to bind on the spindle when the collar is tilted relative thereto, and means providing for said relative tilting action, for attaching said collar to said frame and resilient means, yieldable slightly when load is imposed on the hoist, for raising said support relative to said spindle when the load is relieved, whereby said spud is forced into soft ground by a gradual jacking action during normal operation.

25. In a portable hoist, a frame, a support thereon, a ground engageable spud having a supporting spindle engaging said support and slidable vertically relative thereto, and means for holding said spud in adjusted position comprising a collar loosely encircling said spindle and adapted to bind on the spindle when the collar is tilted relative thereto, and means providing for said relative tilting action, for attaching said collar to said frame and rubber tired wheels for supporting said frame, said tires being yieldable slightly when load is imposed on the hoist and restored when the load is relieved, thereby tending to jack said spud downwardly if the ground is soft.

26. In a portable hoist, a frame, a support thereon, a ground engageable spud mounted on said support by means providing for relative vertical movement therebetween, resilient means associated with said support and yieldable slightly when load is imposed thereon, for raising said support relative to said spud when the load is relieved, and releasable means for locking said spud against upward movement relative to said support but permitting downward movement, whereby said spud is jacked downwardly during operation in soft ground.

27. In combination, a load supporting frame, resilient means for supporting the latter, a spud mounted on said frame by means providing for relative vertical movement therebetween, and releasable means for locking said spud against upward movement relative to said frame but permitting downward movement relative thereto, whereby said spud is jacked into soft ground or the like by alternate loading and unloading of said frame.

28. In a portable hoist, a frame, wheels for supporting the frame, rubber tires on said wheels adapted to yield slightly when load is imposed on said hoist, a spud mounted on said frame by means providing for relative vertical movement therebetween, and releasable means for locking said spud against upward movement relative to said frame but permitting downward movement relative thereto, whereby said spud is jacked into soft ground or the like by alternate loading and unloading of said frame.

29. In a portable hoist, a frame, wheels for supporting the frame, rubber tires on said wheels adapted to yield slightly when load is imposed on said frame, a mast carried by the frame, hoisting mechanism on said mast, a ground engageable spud having a spindle telescopically related to said mast and shiftable vertically relative thereto, and releasable means for locking said spindle against upward movement relative to said mast but permitting downward movement relative thereto, whereby said spud is jacked into soft ground or the like by alternate loading and unloading of said frame.

FRANK T. COURT.
HAROLD M. STUELAND.